United States Patent [19]

Kwon

[11] Patent Number: 6,034,786
[45] Date of Patent: Mar. 7, 2000

[54] APPARATUS AND METHOD FOR ENLARGING OR REDUCING AN IMAGE IN AN IMAGE PROCESSING SYSTEM

[75] Inventor: Oh-Joon Kwon, Seoul, Rep. of Korea

[73] Assignee: SamSung Electronics Co., Ltd., Kyungki-do, Rep. of Korea

[21] Appl. No.: 08/922,301

[22] Filed: Sep. 2, 1997

[30] Foreign Application Priority Data

Sep. 2, 1996 [KR] Rep. of Korea ............... 96-37916

[51] Int. Cl.[7] .................. B41B 15/00; B41J 15/00; H04N 1/393; H04N 1/40
[52] U.S. Cl. ................. 358/1.2; 358/1.2; 358/1.9; 358/451; 358/447; 382/298; 382/247
[58] Field of Search ................. 395/102, 109; 358/451, 447, 448, 299, 400, 401, 440, 449, 504, 509, 512, 1.2, 1.9; 382/298, 247

[56] References Cited

U.S. PATENT DOCUMENTS

| | | |
|---|---|---|
| 4,628,534 | 12/1986 | Marshall . |
| 4,686,580 | 8/1987 | Kato et al. . |
| 4,930,022 | 5/1990 | Kubota ............................. 358/451 |
| 5,280,365 | 1/1994 | Nannichi et al. ............... 358/451 |
| 5,309,253 | 5/1994 | Ariga et al. ..................... 358/451 |
| 5,309,524 | 5/1994 | Hirabayashi et al. ........... 382/47 |
| 5,387,985 | 2/1995 | Loce et al. ....................... 358/447 |
| 5,434,953 | 7/1995 | Bloomberg ...................... 395/155 |
| 5,453,846 | 9/1995 | Tsao et al. . |
| 5,465,166 | 11/1995 | Kamo ............................... 358/451 |
| 5,489,990 | 2/1996 | Ishikawa ......................... 358/451 |
| 5,511,137 | 4/1996 | Okada .............................. 382/298 |
| 5,535,007 | 7/1996 | Kim .................................. 358/296 |
| 5,539,533 | 7/1996 | Kato ................................. 358/451 |
| 5,553,201 | 9/1996 | Muramatsu ..................... 395/109 |
| 5,555,557 | 9/1996 | Mailloux .......................... 382/299 |
| 5,566,005 | 10/1996 | Yamada ........................... 358/451 |
| 5,604,825 | 2/1997 | Hirota et al. ................... 382/261 |
| 5,615,281 | 3/1997 | Yamaguchi ..................... 382/162 |
| 5,621,826 | 4/1997 | Katayama et al. ............. 382/292 |
| 5,642,203 | 6/1997 | Sawano et al ................... 358/451 |
| 5,646,741 | 7/1997 | Horiuchi et al. ............... 358/298 |

Primary Examiner—Edward L. Coles
Assistant Examiner—Twyler Lamb
Attorney, Agent, or Firm—Robert E. Bushnell, Esq.

[57] ABSTRACT

An apparatus and method for modifying an enlargement ratio or a reduction ratio of an image. An image reduction apparatus for reducing an image and for transmitting a reduced image to a printer includes a controller for generating position information relative to a pixel and a line constituting an image, a scanner for receiving an image of a document and for generating intermediate tone image data in pixel units according to the position information, and an image processor for receiving the position information, for determining whether or not the intermediate tone image data transmitted from the scanner should be supplied to the printer, and for discarding the intermediate tone image data or transmitting the intermediate tone image data to the printer according to the latter determination. An image enlargement apparatus includes the same basic components, but converts an enlargement ratio into a conversion ratio for enlargement, the enlargement process being followed by a reduction process as appropriate.

13 Claims, 4 Drawing Sheets

|       |       |       |       |
|-------|-------|-------|-------|
| (1,1) | (1,2) | (1,3) | (1,4) |
| (2,1) | (2,2) | (2,3) | (2,4) |
| (3,1) | (3,2) | (3,3) | (3,4) |
| (4,1) | (4,2) | (4,3) | (4,4) |

FIG. 3A

|       |       |
|-------|-------|
| (2,1) | (2,3) |
| (4,1) | (4,3) |

FIG. 3B

APPARATUS AND METHOD FOR ENLARGING OR REDUCING AN IMAGE IN AN IMAGE PROCESSING SYSTEM

CLAIM OF PRIORITY

This application makes reference to, incorporates the same herein, and claims all benefits accruing under 35 U.S.C. §119 from an application for APPARATUS AND METHOD FOR MODIFYING ENLARGED RATIO OR REDUCED RATIO OF IMAGE earlier filed in the Korean Industrial Property Office on Sep. 2, 1996 and there duly assigned Ser. No. 37916/1996.

BACKGROUND OF THE INVENTION

1. Field of the Invention

The present invention relates to an apparatus and method for enlarging or reducing an image in an image processing system and, more particularly, to an apparatus and method for modifying an enlargement ratio or a reduction ratio of an image in real time by using a sampling technique.

2. Related Art

In image processing systems, such as a digital copier or a facsimile, it may be necessary to reduce or enlarge an image. In the facsimile, for example, if there is a difference in resolution between an input device (a scanner) and an output device (a printer), or if there is a difference in the size between an input sheet and an output sheet, the image is appropriately reduced. A first method for reducing the image proceeds as follows: a few reduction ratios are determined, a periodic pattern corresponding to each reduction ratio of a binary image is determined, and then a processed pixel and a discarded pixel are determined. In a second method, the position of the processed pixel from the binary image is calculated by using the reduction ratio, and then the discarded pixel and the processed pixel are determined.

The image reducing method using the binary image has a smaller quantity of processed data than that using an image prior to conversion to binary (that is, prior to conversion to an intermediate tone image) but distorts the image. The distortion of the image is due to the fact that a regular pattern generated by a binary conversion processing technique, such as dithering or error diffusion, is simply discarded when reducing the image. If 50% of the image is reduced in the horizontal and vertical directions by using an averaging technique, four adjacent pixels contained in at least two lines are needed to form one pixel of a reduced image. In other words, the formed pixel has an average value derived from the sum of the four pixels, and the reduced image is situated at a position corresponding to the four pixels. Therefore, it is difficult to process the image in real time.

The following U.S. patents are considered to be representative of the prior art relative to the invention disclosed herein: U.S. Pat. No. 5,646,741 to Horiuchi et al., entitled *Image Processing Apparatus And Method Capable Of Smoothing Image Data In Accordance With An Image Enlargement/Reduction Ratio*, U.S. Pat. No. 5,642,203 to Sawano et al., entitled *Method Of Enlarging And Processing Image Data*, U.S. Pat. No. 5,621,826 to Katayama et al., entitled *Image Reduction Apparatus*, U.S. Pat. No. 5,615,281 to Yamaguchi, entitled *Method Of And Apparatus For Generating Reduced Image*, U.S. Pat. No. 5,604,825 to Hirota et al., entitled *Image Processing Apparatus Capable Of Varying Magnification Oc Images And Method Of Using Same*, U.S. Pat. No. 5,566,005 to Yamada, entitled *Image Reducing Apparatus Using Image division, Capable Of Adjusting Overlap In Recording*, U.S. Pat. No. 5,555,557 to Mailloux, entitled *Bit-Map Image Resolution Converter With Controlled Compensation For Write-White Xerographic Laser Printing*, U.S. Pat. No. 5,553,201 to Muramatsu, entitled *Digital Image Processing Device For Automatically Selecting One Of A Plurality Of Different Image Enlarging/Reducing Manners*, U.S. Pat. No. 5,539,533 to Kato, entitled *Facsimile Machine*, U.S. Pat. No. 5,535,007 to Kim, entitled *Method And Device For Adjusting Magnification Of Image*, U.S. Pat. No. 5,511,137 to Okada, entitled *Process And Apparatus For Image Magnification*, U.S. Pat. No. 5,489,990 to Ishikawa, entitled *Image Processing With Smooth Interpolation*, U.S. Pat. No. 5,465,166 to Kamo, entitled *Image Reading Device For Image Recording Equipment*, U.S. Pat. No. 5,434,953 to Bloomberg, entitled *Use Of Fast Textured Reduction For Discrimination Of document Image Components*, U.S. Pat. No. 5,387,985 to Loce, et al., entitled *Non-Integer Image Resolution Conversion Using Statistically Generated Look-Up Tables*, U.S. Pat. No. 5,309,524 to Hirabayashi et al., entitled *Image Reducing Apparatus*, U.S. Pat. No. 5,309,253 to Ariga et al., entitled *Image Enlargement/Reduction processor And Method*, U.S. Pat. No. 5,280,365 to Nannichi et al., entitled *Image Professor With Reduction Of Enlarged Image Data To Form Image Data Enlarged With A Desired Magnification*, and U.S. Pat. No. 4,930,022 to Kubota, entitled *Method And Device For Image Reduction In Image Processing*.

Nevertheless, each of the above patents is burdened by one or more of the disadvantages discussed above, or by disadvantages which will be discussed in the succeeding paragraphs. Thus, there is a need in the prior art for provision of an apparatus and method for enlarging or reducing an image in an image processing system in accordance with the present invention.

SUMMARY OF THE INVENTION

It is, therefore, an object of the present invention to provide an apparatus and method for enlarging or reducing an image in an image processing system.

It is an additional object to provide an image reducing apparatus and method for modifying a reduction ratio of an image by saving image reducing time in order to provide real time processing.

It is an additional object to provide an image enlarging apparatus and method for modifying an enlargement ratio of an image.

In accordance with one aspect of the present invention, an image reducing apparatus for reducing an image and transmitting the reduced image to a printer includes: a controller for generating position information relative to a pixel and a line constituting an image; a scanner for receiving an image of a document and generating intermediate tone image data of a pixel unit of pixel according to the position information; and an image processor for receiving the position information, determining whether or not the intermediate tone image data transmitted from the scanner should be supplied to the printer, and discarding the intermediate tone image data or transmitting the intermediate tone image data to the printer according to the latter determination.

In accordance with another aspect of the present invention, a method for reducing an image into a two-dimensional image and transmitting the reduced image to a printer includes the steps of: receiving reduction ratios relative to horizontal and vertical directions; setting a line select parameter for determining whether any line is selected relative to the reduction ratio corresponding to the vertical direction and designating a start line; reading data of a corresponding line and comparing the line select parameter with a standard ratio; if the line select parameter is greater than the standard ratio, checking whether pixels constituting the corresponding line are selected and supplying only a selected pixel to the printer; and if the line select parameter is less than the standard ratio, designating the next line and returning to the reading step.

In accordance with another aspect of the present invention, an image enlargement apparatus for enlarging an image to form a two-dimensional image and for transmitting an enlarged image to a printer includes: a controller for generating position information relative to a pixel and a line constituting an image; a scanner for receiving an image of a document and for generating image data relative to a pixel unit; and an image processor which receives the position information from the controller and the image data from the scanner, and which processes the image data in accordance with the position information to obtain an enlarged image for transmission to the printer, the image processor receiving an enlargement ratio and determining whether the enlargement ratio is a multiple of an integer or a multiple of a decimal. If the enlargement ratio is a multiple of a decimal, the image processor multiplies the enlargement ratio by a prescribed integer to convert the enlargement ratio into a conversion ratio, and the image processor enlarges the image in accordance with the conversion ratio. The image processor then reduces the enlarged image by a ratio identical to the integer conversion multiplier by setting a line select parameter which designates whether any line is selected. Furthermore, if the line select parameter is greater than a standard ratio, the image processor checks whether pixels constituting the corresponding line are selected and supplies only a selected pixel to the printer; if the line select parameter is less than the standard ratio, the image processor designates the next line and then returns to reading of the data of a corresponding line.

In accordance with another aspect of the present invention, a method for enlarging an image to form a two dimensional image and for transmitting an enlarged image to a printer includes: receiving an enlargement ratio and judging whether the enlargement ratio is a multiple of an integer or a multiple of a decimal; if the enlargement ratio is a multiple of a decimal, multiplying the enlargement ratio by a prescribed integer, which comprises an integer conversion multiplier, to convert the enlargement ratio into a conversion ratio corresponding to a multiple of an integer, and then enlarging the image in accordance with the conversion ratio; reducing the enlarged image by a ratio identical to the integer conversion multiplier by a series of steps involving setting a line select parameter, reading data of a corresponding line, and comparing the line select parameter with a standard ratio. If the line select parameter is greater than the standard ratio, a check is made as to whether pixels constituting the corresponding line are selected and only a selected pixel is supplied to the printer; if the line select parameter is less than the standard ratio, the next line is designated and the precess returns to the step of reading data of a corresponding line and comparing the line select parameter with a standard ratio.

In the following description, numerous specific details, such as the number of pixels, a reduced ratio of an image etc., are set forth to provide a more thorough understanding of the present invention. It will be apparent, however, to one skilled in the art, that the present invention may be practiced without these specific details. In other instances, well known features and constructions are not described so as not to obscure the present invention.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 3A illustrates an image of an object to be reduced;

FIG. 3B illustrates a reduced version of the image of FIG. 3A; and

DETAILED DESCRIPTION OF THE PREFERRED EMBODIMENT

Figure 1:
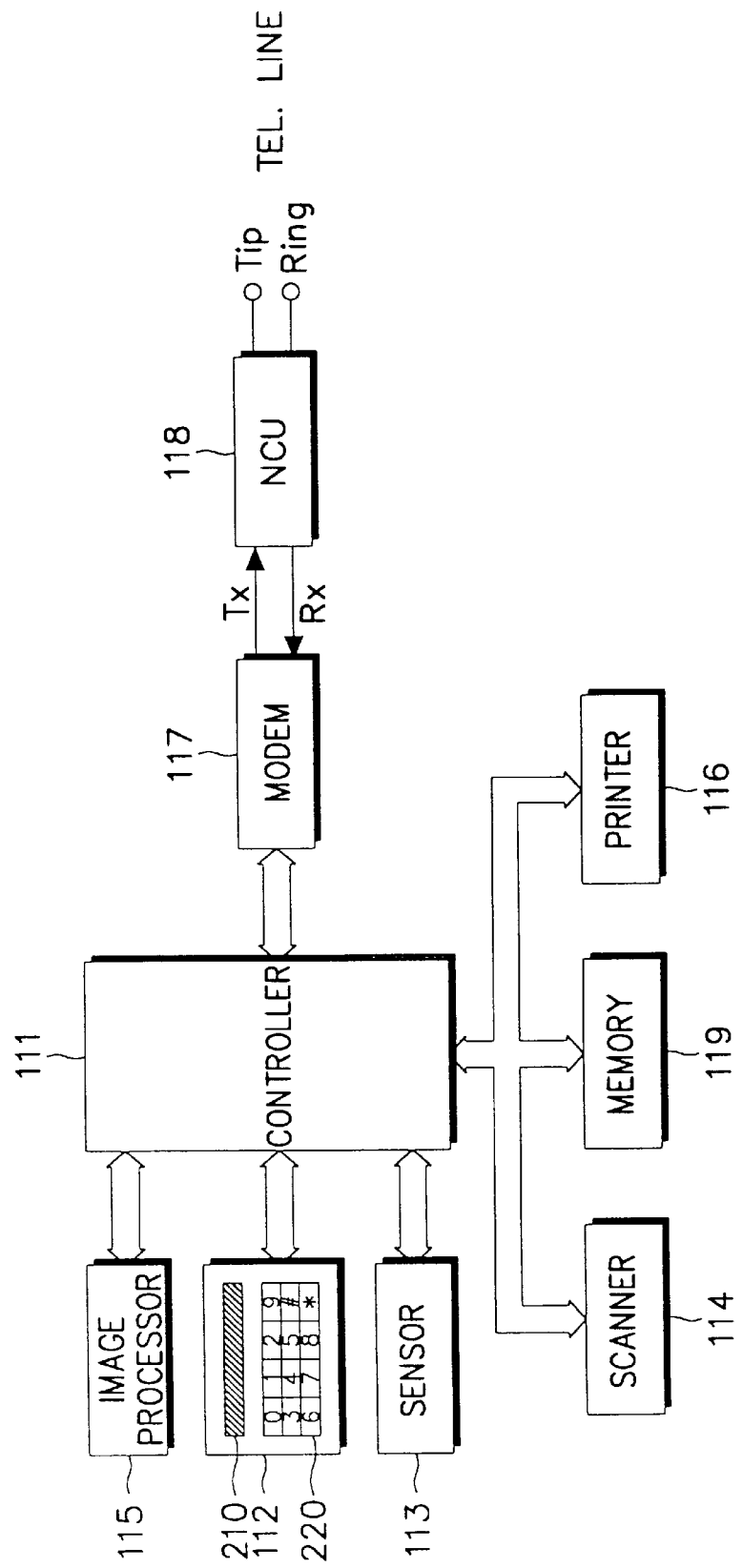
FIG. 1 illustrates a construction of a facsimile system for use with the present invention.

FIG. 1 illustrates a construction of a facsimile system for use with the present invention. A controller 111 controls the overall operation of the facsimile system in a transmitting mode, a receiving mode and a copy mode in accordance with a control program. The controller 111 may have a program memory and a data memory therein, or may be connected to an external memory as indicated by a reference numeral 119. In the program memory, an inventive control program is stored and, in the data memory, data generated during the execution of the program are temporarily stored. An operating panel 112 includes a key input pad 220 and a display unit 210. The key input pad 220 of the operating panel 112 generates data in accordance with keys pressed by the user in order to designate each mode and execute an operation corresponding to the designated mode. The data generated from the key input pad 220 are supplied to the controller 111. The display unit 210 of the operating panel 112 displays an operating state of the system when the controller 111 implements each mode. A sensor 113 senses whether a document is received and whether there is a print sheet. The sensed state signal is supplied to the controller 111. A scanner 114 supplies data which are read from the document, and which are converted photoelectrically by a charge coupled device (not shown) for provision to the controller 111. An image processor 115 codes and decodes image data generated by the scanner 114 and a modem 117. That is, the image processor 115 causes a receiving side to receive nearly the same image as an original image by dividing the image data received from the scanner 114 into background data and text data, or by generating intermediate tone image data. A printer 116 prints the image data received from the image processor 115 during the receiving mode and the copy mode on a print sheet under the control of the controller 111. The modem 117, controlled by the controller 111, modulates data received from the controller 111 to form an analog signal, and demodulates a signal received through a transmission line to form digital data. Namely, during the transmitting mode, the modem 117 modulates the image data generated from the image processor 115 to form a signal consistent with a facsimile transmission standard specification. During the receiving mode, the modem 117 demodulates a coded image signal received through the transmission line so as to recover its original form. A network control unit (NCU) 118, controlled by the controller 111, forms a transmitting/receiving path between a telephone line and the modem 117.

Figure 2:
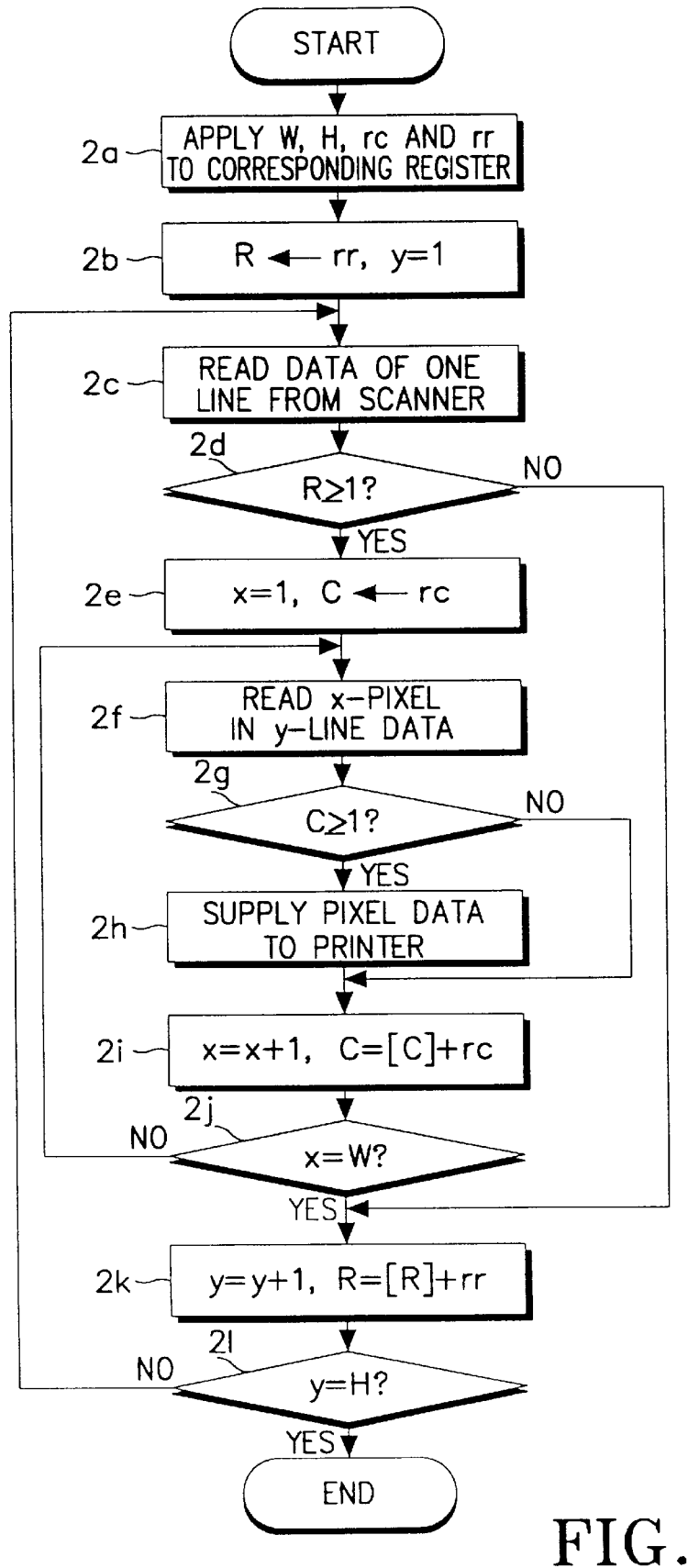
FIG. 2 is a flow chart illustrating an image reduction process according to the present invention.

FIG. 2 is a flow chart illustrating an image reduction process. At step 2a, the image processor 115 applies parameters W, H, rc and rr to a corresponding register. The parameter W designates the number of pixels in the horizontal direction of an image to be reduced, H designates the number of pixels in the vertical direction of an image to be reduced; and rc and rr indicate reduction ratios in the horizontal and vertical directions, respectively.

At step 2b, the image processor 115 sets a line select parameter R, designating a line to be transmitted to the printer 116, to rr and sets a parameter y, sequentially designating a corresponding line for reducing the image in the vertical direction, to 1.

At step 2c, the image processor 115 reads the image data of one line from the scanner 114.

At step 2d, the image processor 115 checks whether the line select parameter R is equal to or greater than 1 (where "1" means a standard ratio of an original imnage). If the parameter R is equal to or greater than "1", a parameter x is set to "1", x sequentially designating a pixel in any line for reducing the image in the horizontal direction, and a pixel select parameter C is set to the parameter rc, C designating the pixel to be transmitted to the printer 116 in a line designated by the line select parameter R (step 2e).

At steps 2f–2j, overall processing for reducing each pixel constituting the line is implemented. If all the pixels constituting one line are processed, the parameter y is incremented by 1 to process the next line, and the line select parameter R is set to a value obtained by adding the Gaussian function for R to the parameter rr (step 2k) and subtracting the result from the current value of R.

At step 2l a determination is made as to whether the parameter y is equal to the parameter H, indicating the number of pixels in the vertical direction of the image to be reduced. If the parameter y is equal to H, then the processing of all the lines has been completed, and the task is ended; if not, the process returns to step 2c.

Referring back to step 2d, if it is determined that the line select parameter R is less than 1, then the process transfers to step 2k to discard the line data read in step 2c. Thus, if an operation for discarding data of one line is executed under constant conditions, the image in the vertical direction is reduced.

The operation of steps 2f to 2j for processing each pixel constituting one line will now be described. If an effective line is designated, the image processor 115 reads the first pixel from the pixels constituting that line (step 2f). At step 2g, the image processor 115 determines whether the pixel select parameter C is equal to or greater than 1 (where "1" means a standard ratio of the original image). If so, the image processor 115 supplies pixel data to the printer 116 (step 2h). The parameter x is incremented by 1, and the pixel select parameter C is set to a value obtained by adding the Gaussian function for the pixel select parameter C to the parameter rc and subtracting the result from the current value of C (step 2i). At step 2j, a determination is made as to whether the parameter x is equal to W. If the parameter x is equal to the parameter W, indicating the number of pixels in the horizontal direction of the image to be reduced, then processing of all pixels of a corresponding line has been completed. In that case, the parameter y is incremented by 1 and the line select parameter R is set to a value obtained by adding the Gaussian function for R to the parameter rr as described above. If step 2j results in a determination that the parameter x is not equal to W, then a return to step 2f is executed, and the next pixel is processed.

FIG. 3A illustrates an image of an object to be reduced, and FIG. 3B shows a reduced version of the image of FIG. 3A. For convenience, it is assumed that the size of the image is 4×4. Each pixel is indicated by (x, y). If the image of FIG. 3A is reduced through the process of FIG. 2, processed lines, discarded lines, processed pixels and discarded pixels are distinguished. For example, if the image of FIG. 3A is reduced to 50%, the first line (y=1) is processed and the second line (y=2) is discarded. In the first line, a pixel (1, 1) is discarded and a pixel (2, 1) is processed to reduce the image in the vertical and horizontal directions. In FIG. 3B, there are shown pixels constituting the reduced image, that is, pixels to be transmitted to the printer 116.

If the two-dimensional reduction of a pixel unit and line is achieved by a reduction ratio of a unit of 1%, and a register for storing a reciprocal of the reduction ratio has 9-bit size, the seven least significant bits store the decimal places of the reduction ratio. If the number of bits corresponding to the decimal places is 7, a reduction ratio of $\frac{1}{128}$ can be achieved. A register for storing a reciprocal of the reduction ratio in the horizontal direction and a register for storing a reciprocal of the reduction ratio in the vertical direction are needed. A horizontal position register and a vertical position register are also needed to calculate and store a position of the pixel in order to determine the processed pixels and the discarded pixels. As those position registers, 9-bit registers may be used. The calculation means that the position register is added to the register for storing the reciprocal of the reduction ratio in order to calculate the position of a processed pixel. Since contents of the two registers to be calculated are each 9 bits in size, a 9-bit adder is used. If the calculation of the vertical and horizontal directions is processed by one adder and a multiplexer is used for pre-processing, the use of unnecessary hardware logic can be prevented. Signals indicating start and end points of pixel processing and signals indicating start and end points of line processing are needed. To achieve a reduction ratio less than 1%, only the numbers of bits of the register and adder are increased.

Figure 4:
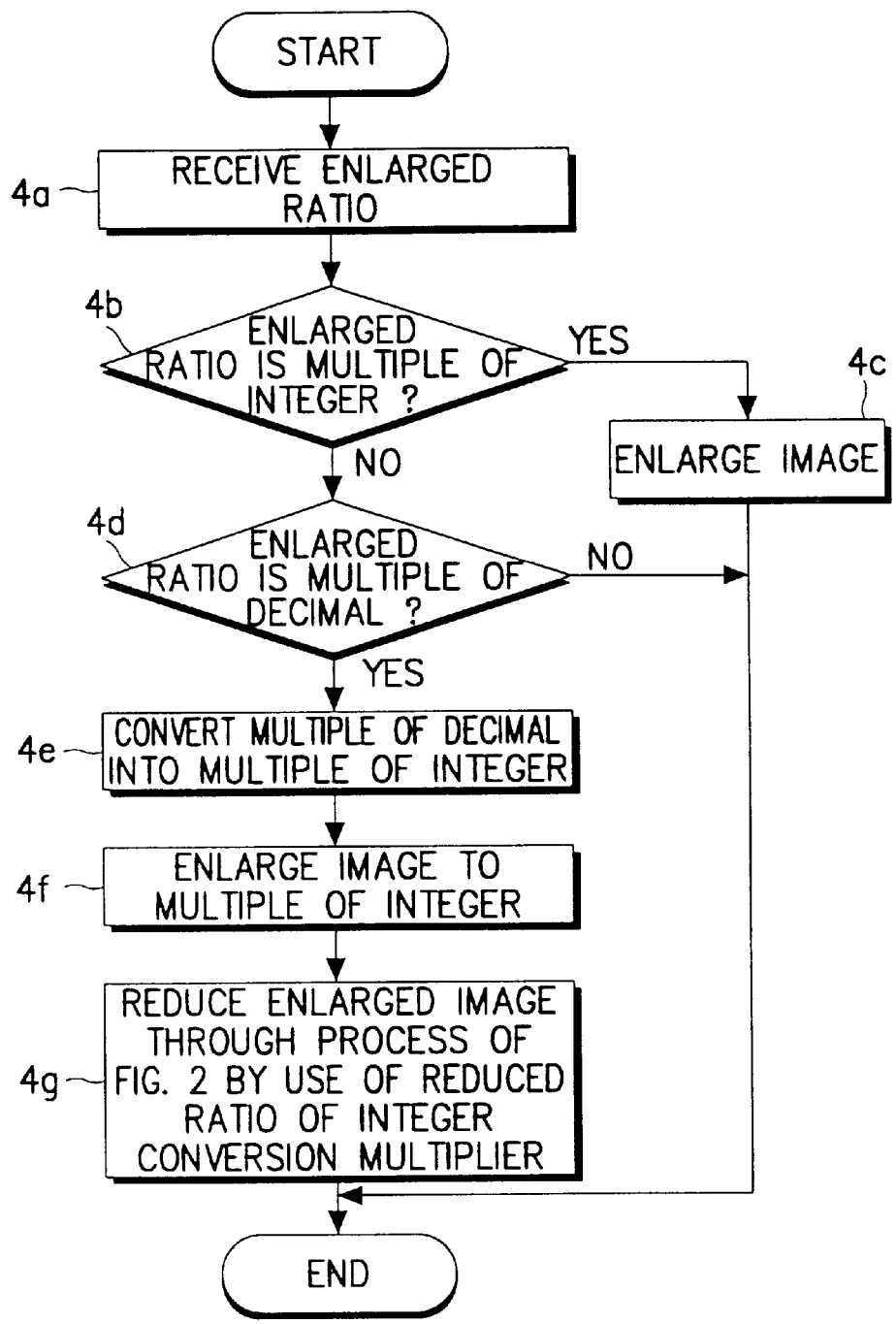
FIG. 4 is a flow chart illustrating an image enlarging process according to the present invention.

FIG. 4 illustrates an image enlarging process. If the enlargement ratio is a multiple of an integer, steps 4a to 4c are executed. If the enlargement ratio is a multiple of a decimal, as determined at step 4d, the enlargement ratio is converted into a multiple of an integer by multiplying it by a prescribed integer called an integer conversion multiplier (step 4e). At step 4f, an image is enlarged to the multiple of an integer. At step 4g, the enlarged image is reduced through the image reduction process of FIG. 2 by use of a reduction ratio equal to the integer conversion multiplier. Then, a desired enlarged image can be obtained. For example, if it is desired to enlarge an image by 1.5 times, the integer conversion multiplier is 2. Therefore, the image is enlarged to 3 times, and the enlarged image is reduced to one-half through the image reduction process of FIG. 2. In this way, a desired image enlarged by 1.5 times is obtained. To enlarge the image at steps 4c and 4f, the same pixel is repeatedly transmitted. For instance, in order to enlarge the image by 3 times, the same pixel is supplied to the printer three times.

As noted above, hardware manufacturing cost can be saved, and there is no time delay generated by the reduction of the image since each pixel is processed while, at the same time, a check for processing or discarding an output value is made. That is, it is possible to process the image in real time and the hardware is small in size. If the present invention is applied to a facsimile requiring reduction between 50% and 100%, a better image or picture quality is obtained than is obtained by reducing a binary image, and the image distortion or bleeding phenomenon of a black pixel can be prevented.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. An image reduction apparatus for reducing an image and transmitting a reduced image to a printer, said apparatus comprising:

controller means for generating position information relative to a pixel and a line constituting an image;

scanner means for receiving an image of a document and for generating intermediate tone image data relative to a pixel unit in accordance with said position information; and image processor means for receiving said position information, for determining whether said intermediate tone image data generated by said scanner means should be supplied to said printer, and for selectively discarding said intermediate tone image data or transmitting said intermediate tone image data to said printer according to the latter determination.

2. The apparatus as claimed in claim 1, wherein said image processor means receives reduction ratios for horizontal and vertical directions, and sets a line select parameter, which designates whether a line is selected, to the reduction ratio in the vertical direction, and then designates a start line;

wherein said image processor means reads data of a corresponding line and compares said line select parameter with a standard ratio;

wherein said image processor means determines whether said line select parameter is greater than said standard ratio, and, if said line select parameter is greater than said standard ratio, said image processor means checks whether pixels constituting said corresponding line are selected and supplies only selected pixels to said printer; and wherein, if said line select parameter is less than said standard ratio, said image processor means designates the next line and returns to reading of said data.

3. The apparatus as claimed in claim 2, wherein said image processor means sets a pixel select parameter, which designates whether any pixel is selected, to the reduction ratio in the horizontal direction, and then designates a start pixel;

wherein said image processor means reads data of a corresponding pixel and compares said pixel select parameter with a standard ratio; and wherein, if said pixel select parameter is greater than said standard ratio, said image processor means adds the reduction ratio in the horizontal direction to said pixel select parameter, and then supplies said pixel to said printer.

4. A method for reducing an image to form a two-dimensional image and for transmitting a reduced image to a printer, said method comprising the steps of:

(a) receiving reduction ratios for horizontal and vertical directions;

(b) setting a line select parameter, which designates whether a line is selected, to the reduction ratio in the vertical direction, and then designating a start line;

(c) reading data of a corresponding line and comparing said line select parameter with a standard ratio;

(d) if said line select parameter is greater than said standard ratio, checking whether pixels constituting said corresponding line are selected and supplying only selected pixels to said printer; and (e) if said line select parameter is less than said standard ratio, designating the next line and returning to step (c).

5. The method as claimed in claim 4, wherein step (d) includes the steps of:

setting a pixel select parameter, which designates whether any pixel is selected, to the reduction ratio in the horizontal direction, and then designating a start pixel;

reading data of a corresponding pixel and comparing the pixel select parameter with a standard ratio; and if said pixel select parameter is greater than said standard ratio, adding the reduction ratio in the horizontal direction to the pixel select parameter and supplying said pixel to said printer.

6. A method for enlarging an image to form a two-dimensional image and for transmitting an enlarged image to a printer, said method comprising the steps of:

(a) receiving an enlargement ratio and judging whether the enlargement ratio is a multiple of an integer or a multiple of a decimal;

(b) if the enlargement ratio is a multiple of a decimal, multiplying the enlargement ratio by a prescribed integer, comprising an integer conversion multiplier, to convert the enlargement ratio into a conversion ratio corresponding to a multiple of an integer, and enlarging an image in accordance with the conversion ratio; and (c) reducing the enlarged image by a ratio identical to the integer conversion multiplier through the steps of:

(i) setting a line select parameter, which designates whether any line is selected, to the integer conversion multiplier, and then designating a start line, (ii) reading data of a corresponding line and comparing the line select parameter with a standard ratio, (iii) if the line select parameter is greater than the standard ratio, checking whether pixels constituting said corresponding line are selected, and then supplying only a selected pixel to said printer, and (iv) if the line select parameter is less than the standard ratio, designating the next line and returning to step (ii).

7. The method as claimed in claim 6, wherein step (iii) includes the steps of:

setting a pixel select parameter, which designates whether any pixel is selected, to the integer conversion multiplier, and then designating a start pixel;

reading data of a corresponding pixel and comparing the pixel select parameter with a standard ratio; and if the pixel select parameter is greater than the standard ratio, adding the integer conversion multiplier to the pixel select parameter and supplying the pixel data to said printer.

8. The method as claimed in claim 7, wherein said image is enlarged by repeatedly supplying an input pixel to said printer in accordance with said enlargement ratio to enlarge said image in a horizontal direction, and by repeatedly supplying, to said printer, line data enlarged in said horizontal direction in accordance with said enlargement ratio to enlarge said image in a vertical direction.

9. The method as claimed in claim 6, wherein said image is enlarged by repeatedly supplying an input pixel to said printer in accordance with said enlargement ratio to enlarge said image in a horizontal direction, and by repeatedly supplying, to said printer, line data enlarged in said horizontal direction in accordance with said enlargement ratio to enlarge said image in a vertical direction.

10. An image enlargement apparatus for enlarging an image to form a two-dimensional image for transmitting an enlarged image to a printer, said apparatus comprising:

controller means for generating position information relative to a pixel and a line constituting an image;

scanner means for receiving an image of a document and for generating image data relative to a pixel unit; and image processor means for receiving said position information from said controller means and said image data from said scanner means, and for processing said image data in accordance with said position information to obtain said enlarged image for transmission to said printer;

wherein said image processor means receives an enlargement ratio and determines whether the enlargement ratio is a multiple of an integer or a multiple of a decimal;

wherein, if the enlargement ratio is a multiple of a decimal, said image processor means multiplies the enlargement ratio by a prescribed integer, comprising an integer conversion multiplier, to convert the enlargement ratio into a conversion ratio corresponding to a multiple of an integer, and said image processor means enlarges the image in accordance with the conversion ratio;

wherein said image processor means reduces the enlarged image by a ratio identical to the integer conversion multiplier by setting a line select parameter, which designates whether any line is selected, to the integer conversion multiplier, by designating a start line, by reading data of a corresponding line, and by comparing the line select parameter with a standard ratio;

wherein, if the line select parameter is greater than the standard ratio, said image processor means checks whether pixels constituting said corresponding line are selected and supplies only a selected pixel to said printer; and wherein, if the line select parameter is less than the standard ratio, said image processor means designates the next line and then returns to said reading of said data of a corresponding line.

11. The apparatus as claimed in claim 10, wherein said image processor means sets a pixel select parameter, which designates whether any pixel is selected, to the integer conversion multiplier, and then designates a start pixel;

wherein said image processor means reads data of a corresponding pixel and compares the pixel select parameter with a standard ratio; and wherein, if the pixel select parameter is greater than the standard ratio, said image processor means adds the integer conversion multiplier to the pixel select parameter and supplies said pixel data to said printer.

12. The apparatus as claimed in claim 11, wherein said image processor means enlarges said image by repeatedly supplying an input pixel to said printer in accordance with the enlargement ratio to enlarge said image in a horizontal direction, and said image processor means repeatedly supplies, to said printer, line data enlarged in the horizontal direction in accordance with the enlargement ratio to enlarge said image in a vertical direction.

13. The apparatus as claimed in claim 10, wherein said image processor means enlarges said image by repeatedly supplying an input pixel to said printer in accordance with the enlargement ratio to enlarge said image in a horizontal direction, and said image processor means repeatedly supplies, to said printer, line data enlarged in the horizontal direction in accordance with the enlargement ratio to enlarge said image in a vertical direction.

* * * * *